US 6,697,758 B2

(12) United States Patent
McCall et al.

(10) Patent No.: US 6,697,758 B2
(45) Date of Patent: *Feb. 24, 2004

(54) PROCESSING METHOD FOR MOTION MEASUREMENT

(75) Inventors: Hiram McCall, Chatsworth, CA (US); Ching-Fang Lin, Chatsworth, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/080,176

(22) Filed: Feb. 19, 2002

(65) Prior Publication Data

US 2002/0077768 A1 Jun. 20, 2002

Related U.S. Application Data

(62) Division of application No. 09/444,440, filed on Nov. 22, 1999.
(60) Provisional application No. 60/149,802, filed on Aug. 18, 1999.

(51) Int. Cl.[7] ............................................. G06F 15/00
(52) U.S. Cl. ........................ 702/141; 701/11; 701/220
(58) Field of Search ................................. 702/150, 151, 702/152, 141, 142, 144, 145, 153, 93, 94, 95; 701/220, 11

(56) References Cited

U.S. PATENT DOCUMENTS

| 4,254,465 | A | * | 3/1981 | Land | 701/220 |
| 4,303,978 | A | * | 12/1981 | Shaw et al. | 701/220 |
| 4,914,598 | A | * | 4/1990 | Krogmann et al. | 701/11 |
| 5,331,578 | A | * | 7/1994 | Stieler | 702/93 |
| 6,473,713 | B1 | * | 10/2002 | McCall et al. | 702/141 |

* cited by examiner

Primary Examiner—Marc S. Hoff
Assistant Examiner—Mohamed Charioui
(74) Attorney, Agent, or Firm—Raymond Y. Chan; David and Raymond Patent Group

(57) ABSTRACT

A processing method for motion measurement, which is adapted to be applied to output signals proportional to rotation and translational motion of the carrier, respectively from angular rate sensors and acceleration sensors, is more suitable for emerging MEMS (MicroElectronicMechanicalSystem) angular rate and acceleration sensors. Compared with a conventional IMU, the present invention utilizes a feedforward open-loop signal processing scheme to obtain highly accurate motion measurements by means of signal digitizing, temperature control and compensation, sensor error and misalignment calibrations, attitude updating, and damping control loops, and dramatically shrinks the size of mechanical and electronic hardware and power consumption, meanwhile, obtains highly accurate motion measurements.

2 Claims, 15 Drawing Sheets

PROCESSING METHOD FOR MOTION MEASUREMENT

CROSS REFERENCE OF RELATED APPLICATIONS

This is a divisional application of a non-provisional application, application Ser. No. 09/444,440, filed Nov. 22, 1999, which is a regular application of a provisional application, application Ser. No. 60/149,802, filed Aug. 18, 1999.

BACKGROUND OF THE PRESENT INVENTION

1. Field of the Present Invention

The present invention relates to a processing method for motion measurements, and more particularly to a processing method for a motion inertial measurement unit, wherein output signals of angular rate producer and acceleration producer, including angular rate device array and acceleration device array, or an angular rate and acceleration simulator, are processed to obtain highly accurate attitude and heading measurements of a carrier under dynamic environments.

2. Description of Related Arts

Generally, conventional methods for determining the motion of a carrier are to employ inertial angular rate devices and acceleration devices, including gyros and accelerometers, radio positioning systems, and hybrid systems.

Conventional inertial angular rate devices and acceleration devices, including gyros and accelerometers, which are commonly used in inertial systems and sense rotation and translation motion of a carrier, include Floated Integrating Gyros (FIG), Dynamically-Tuned Gyros (DTG), Ring Laser Gyros (RLG), Fiber-Optic Gyros (FOG), Electrostatic Gyros (ESG), Josephson Junction Gyros (JJG), Hemisperical Resonating Gyros (HRG), Pulsed Integrating Pendulous Accelerometer (PIPA), Pendulous Integrating Gyro Accelerometer (PIGA), etc.

New horizons are opening up for inertial sensor device technologies. MEMS (MicroElectronicMechanicalSystem) inertial sensors offer tremendous cost, size, reliability improvements for guidance, navigation, and control systems, compared with conventional inertial sensors. It is well-known that the silicon revolution began over three decades ago, with the introduction of the first integrated circuit. The integrated circuit has changed virtually every aspect of our lives. The hallmark of the integrated circuit industry over the past three decades has been the exponential increase in the number of transistors incorporated onto a single piece of silicon. This rapid advance in the number of transistors per chip leads to integrated circuits with continuously increasing capability and performance. As time has progressed, large, expensive, complex systems have been replaced by small, high performance, inexpensive integrated circuits. While the growth in the functionality of microelectronic circuits has been truly phenomenal, for the most part, this growth has been limited to the processing power of the chip.

MEMS, or, as stated more simply, micromachines, are considered the next logical step in the silicon revolution. It is believed that this next step will be different, and more important than simply packing more transistors onto silicon. The hallmark of the next thirty years of the silicon revolution will be the incorporation of new types of functionality onto the chip structures, which will enable the chip to, not only think, but to sense, act, and communicate as well.

MEMS exploits the existing microelectronics infrastructure to create complex machines with micron feature sizes. These machines can have many functions, including sensing, communication, and actuation. Extensive applications for these devices exist in a wide variety of commercial systems.

It is quite a straightforward idea that we can exploit the MEMS inertial sensors' merits of small size, low cost, batch processing, and shock resistance to develop a low cost, light weight, miniaturized, highly accurate integrated MEMS motion measurement system.

Existing processing methods for motion inertial measurement unit are most suitable for conventional gyros and accelerometers, and can not produce optimal performance for MEMS angular rate device and acceleration device.

SUMMARY OF THE PRESENT INVENTION

The main objective of the present invention is to provide a processing method, wherein output signals of angular rate producer and acceleration producer, including an angular rate device array and acceleration device array, or an angular rate and acceleration simulator, are processed to obtain highly accurate attitude and heading measurements of the carrier under dynamic environments.

Another objective of the present invention is to provide a processing method, wherein output voltage signals of angular rate producer and acceleration producer, including angular rate device array and acceleration device array, or an angular rate and acceleration simulator, are processed to obtain digital highly accurate digital angular increment and velocity increment measurements of the carrier, and are further processed to obtain highly accurate attitude and heading measurements of the carrier under dynamic environments. The present invention can be applicable to existing angular rate devices and acceleration devices, but is more suitable for emerging MEMS angular rate devices and acceleration devices assembled into a core micro IMU. The present invention enables the core micro IMU, which has the following unique features:

(1) Attitude Heading Reference System (AHRS) Capable Core Sensor Module.
(2) Miniaturized (Length/Width/Height) and Light Weight.
(3) High Performance and Low Cost.
(4) Low Power Dissipation.
(5) Dramatic Improvement In Reliability (microelectromechanical systems—MEMS).

Another objective of the present invention is to provide a processing method wherein output voltage signals of angular rate producer and acceleration producer, including angular rate device array and acceleration device array, or an angular rate and acceleration simulator, are processed to obtain digital highly accurate digital angular increment and velocity increment measurements of the carrier, and are further processed to obtain highly accurate attitude and heading measurements of the carrier under dynamic environments. The present invention enables the core micro IMU to be into an integrated micro land navigator, which has the following unique features:

(1) Miniature, light weight, low power, low cost.
(2) AHRS, odometer, integrated GPS chipset and flux valve.
(3) Integration filter for sensor data fusion and zero velocity updating.
(4) Typical applications: automobiles, railway vehicles, miniature land vehicles, robots, unmanned ground vehicles, personal navigators, and military land vehicles.

Another objective of the present invention is to provide a processing method wherein output voltage signals of angular rate producer and acceleration producer, including angular rate device array and acceleration device array, or an angular rate and acceleration simulator, are processed to obtain digital highly accurate digital angular increment and velocity increment measurements of the carrier, and are further processed to obtain highly accurate attitude and heading measurements of the carrier under dynamic environments. The present invention enables the core micro IMU to function as aircraft inertial avionics, which has the following unique features:

(1) Rate Gyro (2) Vertical Gyro (3) Directional Gyro (4) AHRS (5) IMU (6) Inertial Navigation System (7) Fully-Coupled GPS/MEMS IMU Integrated System (8) Fully-Coupled GPS/IMU/Radar Altimeter Integrated System (9) Universal vehicle navigation and control box.

Another objective of the present invention is to provide a processing method wherein output voltage signals of angular rate producer and acceleration producer, including angular rate device array and acceleration device array, or an angular rate and acceleration simulator, are processed to obtain digital highly accurate digital angular increment and velocity increment measurements of the carrier, and are further processed to obtain highly accurate attitude and heading measurements of the carrier under dynamic environments. The present invention enables the core micro IMU to be a Spaceborne MEMS IMU Attitude Determination System and a Spaceborne Fully-Coupled GPS/MEMS IMU Integrated system for orbit determination, attitude control, payload pointing, and formation flight, which has the following unique features:

(1) Shock resistant and vibration tolerant (2) High anti-jamming (3) High dynamic performance (4) Broad operating range of temperatures (5) High resolution (6) Compact, low power and light weight unit (7) Flexible hardware and software architecture Another objective of the present invention is to provide a processing method wherein output voltage signals of angular rate producer and acceleration producer, including angular rate device array and acceleration device array, or an angular rate and acceleration simulator, are processed to obtain digital highly accurate digital angular increment and velocity increment measurements of the carrier, and are further processed to obtain highly accurate attitude and heading measurements of the carrier under dynamic environments. The present invention enables the core micro IMU to be a marine INS with embedded GPS, which has the following unique features:

(1) Micro MEMS IMU AHRS with Embedded GPS (2) Built-in CDU (Control Display Unit)

(3) Optional DGPS (Differential GPS)

(4) Flexible Hardware and Software System Architecture (5) Low Cost, Light Weight, High Reliability Another objective of the present invention is to provide a processing method wherein output voltage signals of angular rate producer and acceleration producer, including angular rate device array and acceleration device array, or an angular rate and acceleration simulator, are processed to obtain digital highly accurate digital angular increment and velocity increment measurements of the carrier, and are further processed to obtain highly accurate attitude and heading measurements of the carrier under dynamic environments. The present invention enables the core micro IMU to be used in a micro pointing and stabilization mechanism, which has the following unique features:

(1) Micro MEMS IMU AHRS utilized for platform stabilization.

(2) MEMS IMU integrated with the electrical and mechanical design of the pointing and stabilization mechanism.

(3) Vehicle motion, vibration, and other interference cancelled by a stabilized platform.

(4) Variable pointing angle for tracker implementations.

(5) Typical applications: miniature antenna pointing and tracking control, laser beam pointing for optical communications, telescopic pointing for imaging, airborne laser pointing control for targeting, vehicle control and guidance.

DETAIL DESCRIPTION OF THE PREFERRED EMBODIMENT

The present invention relates to a processing method for motion measurements, and more particularly to a processing method for a motion inertial measurement unit, wherein output signals of angular rate producer and acceleration producer, including angular rate device array and acceleration device array, or an angular rate and acceleration simulator, are processed to obtain highly accurate attitude and heading measurements of a carrier under dynamic environments.

The angular rate producer, including angular rate device array or gyro array, provides three-axis angular rate measurement signals of a carrier. The acceleration producer, including acceleration device array or accelerometer array, provides three-axis acceleration measurement signals of the carrier. The motion measurements of the carrier, including attitude and heading angles are achieved by means of processing procedure of the three-axis angular rate measurement signals from the angular rate producer and three-axis acceleration measurement signals from the acceleration producer.

In the present invention, output signals of angular rate producer and acceleration producer are processed to obtain digital highly accurate angular rate increment and velocity increment measurements of the carrier and are further processed to obtain highly accurate attitude and heading measurements of the carrier under dynamic environments. The present invention can be applicable to existing angular rate producers and acceleration producers, but is more suitable for emerging MEMS angular rate devices and acceleration devices, which are assembled into an inertial measurement unit (IMU), including core micro IMU.

Figure 1:
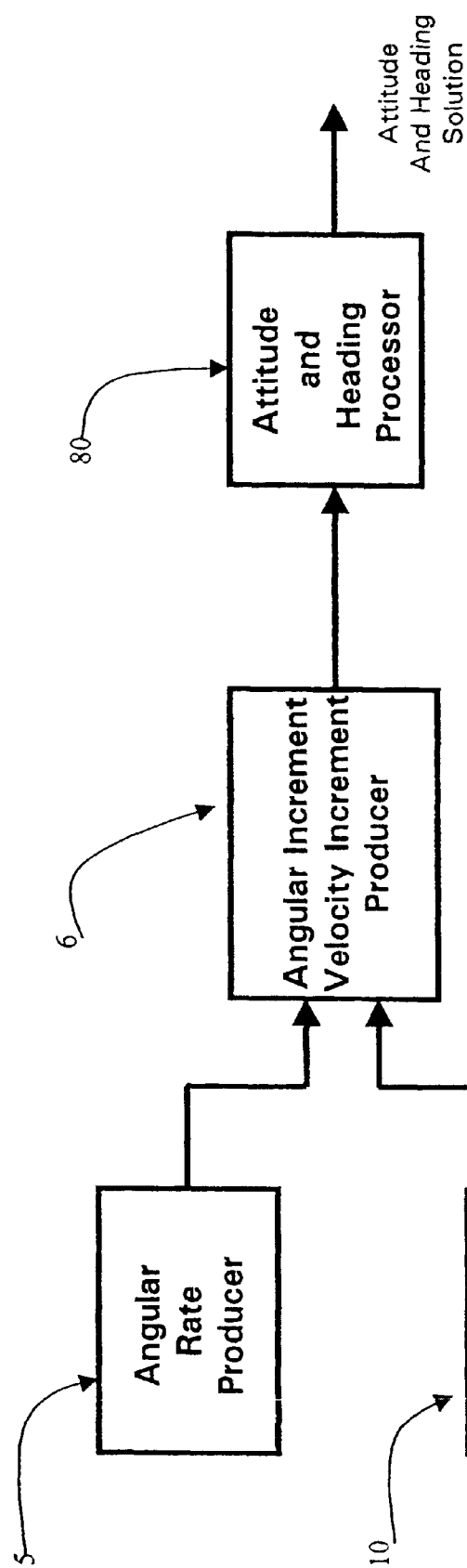
FIG. 1 is a block diagram illustrating the processing module for carrier motion measurements.

Referring to FIG. 1, the processing method for carrier motion measurement of the present invention comprises the following steps:

1. producing three-axis angular rate signals by an angular rate producer 5 and three-axis acceleration signals by an acceleration producer 10,
2. converting the input three-axis angular rate signals into digital angular increments and converting the input three-axis acceleration signals into digital velocity increments in the angular increment and velocity increment producer 6,
3. computing attitude and heading angle measurements using the three-axis digital angular increments and three-axis velocity increments in the attitude and heading processor 80.

Figure 2:
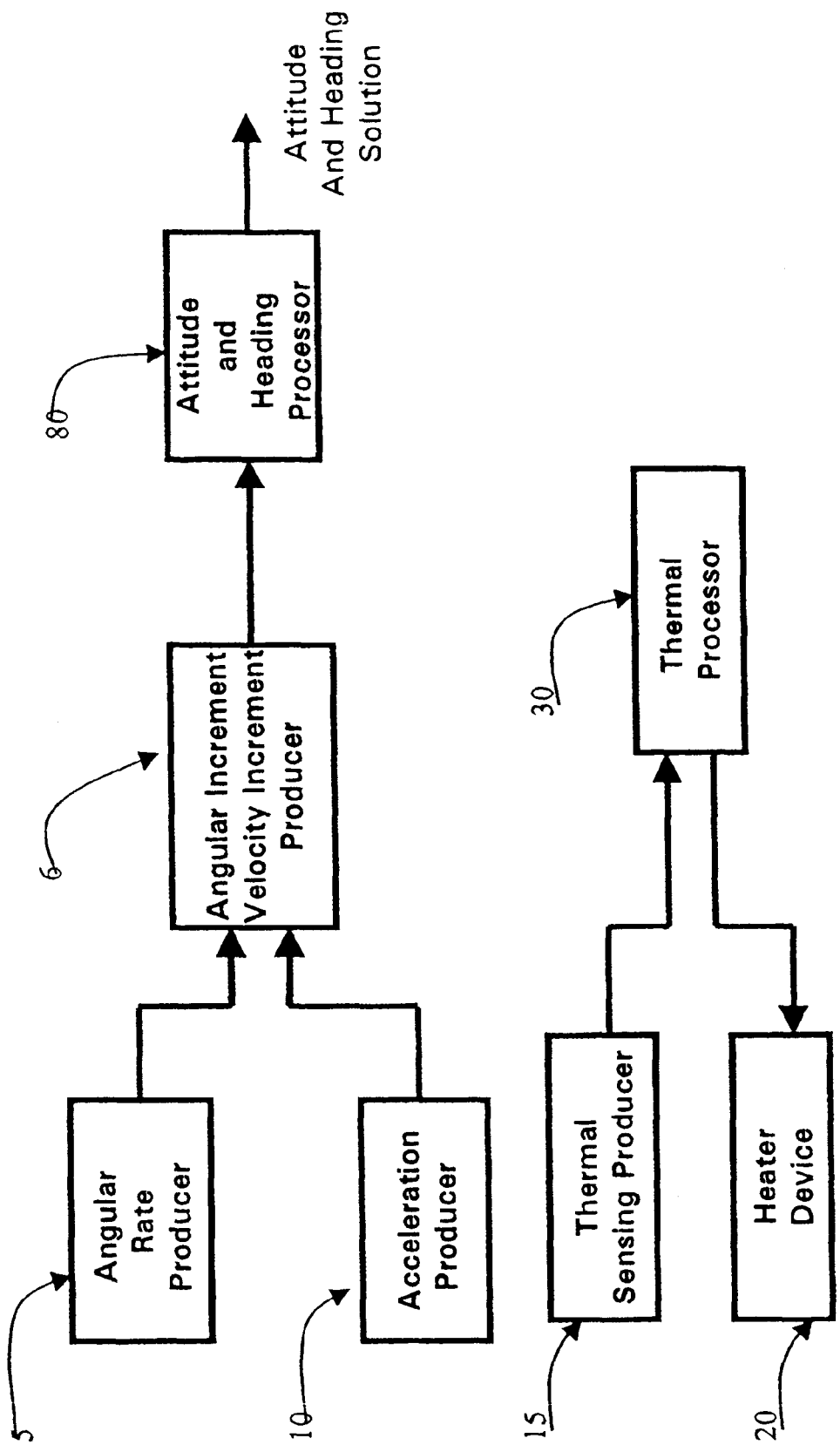
FIG. 2 is a block diagram illustrating the processing modules with thermal control processing for carrier motion measurements.

In general, the angular rate producer and acceleration producer are very sensitive to a variety of temperature environments. In order to improve measurement accuracy, referring to FIG. 2, an additional thermal control processing step, performed in parallel with the above mentioned steps 1~3, comprises:

4. producing temperature signals by the thermal sensing producer 15 to the thermal processor 30; computing temperature control commands using the input temperature signals, pre-determined operating temperature of the angular rate producer and acceleration producer; producing driving signals to the heater device using the temperature control commands; outputting driving signals to the heater device 20.

Temperature characteristic parameters of the angular rate producer and acceleration producer can be determined during a series of the angular rate producer and acceleration producer temperature characteristic calibrations.

Figure 3:
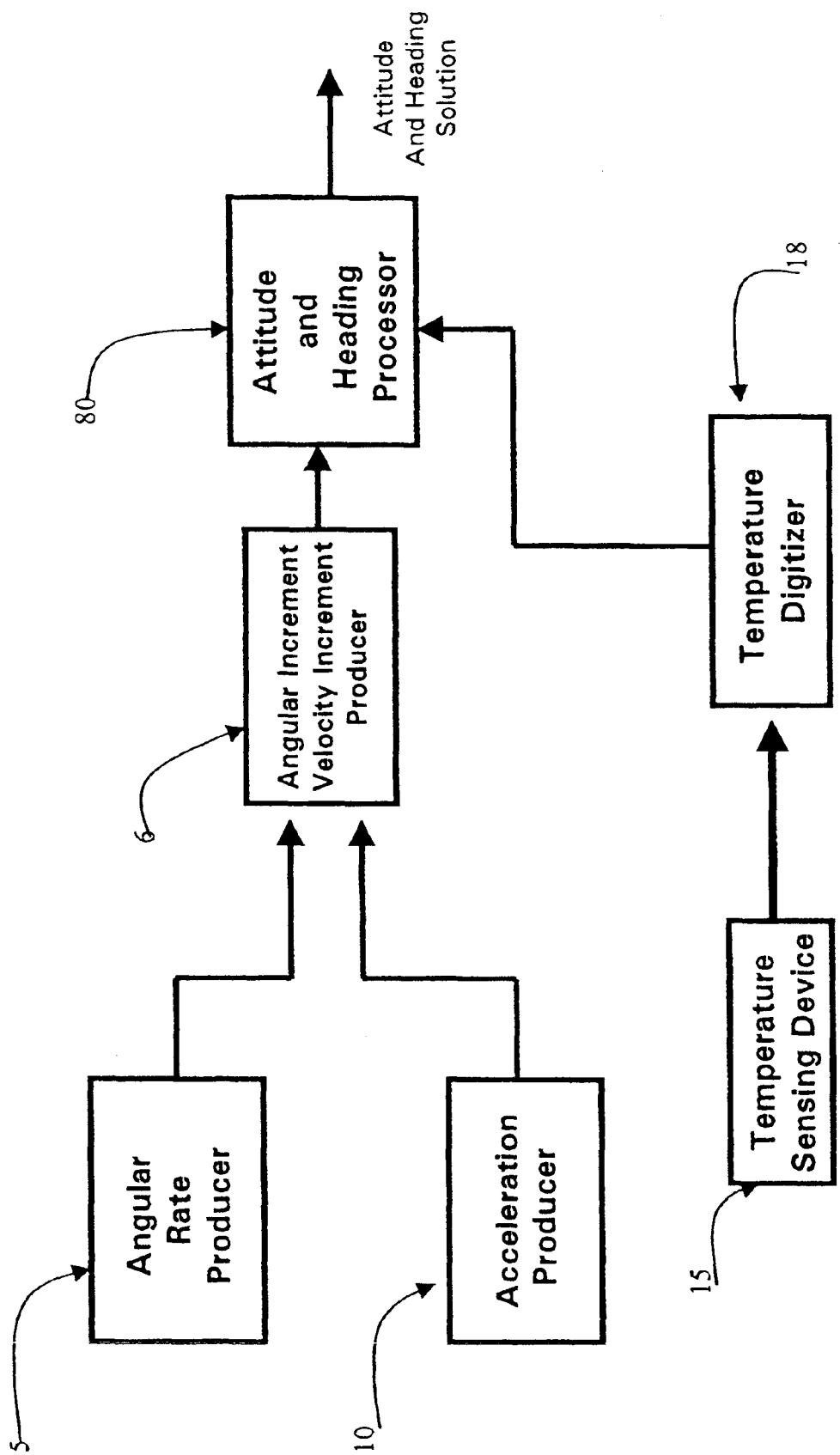
FIG. 3 is a block diagram illustrating the processing modules with thermal compensation processing for carrier motion measurements.

Therefore, the angular rate producer and acceleration producer measurement errors induced by a variety of temperature environments can be compensated in algorithms by replace of the thermal control processing step. Referring to FIG. 3, in order to compensate the angular rate producer and acceleration producer measurement errors induced by a variety of temperature environments without a temperature control loop processing step, the above mentioned step 3 further comprises:

3A.1 producing temperature signals by the thermal sensing producer 15 and outputting digital temperature value to the attitude and heading processor 80 by the temperature digitizer 18, 3A.2 accessing temperature characteristic parameters of the angular rate producer and acceleration producer using the current temperature of the angular rate producers and acceleration producer from the temperature digitizer 18; compensating the errors induced by thermal effects in the input digital angular and velocity increments; computing attitude and heading angle measurements using the three-axis digital angular increments and three-axis velocity increments in the attitude and heading processor 80.

Figure 4:
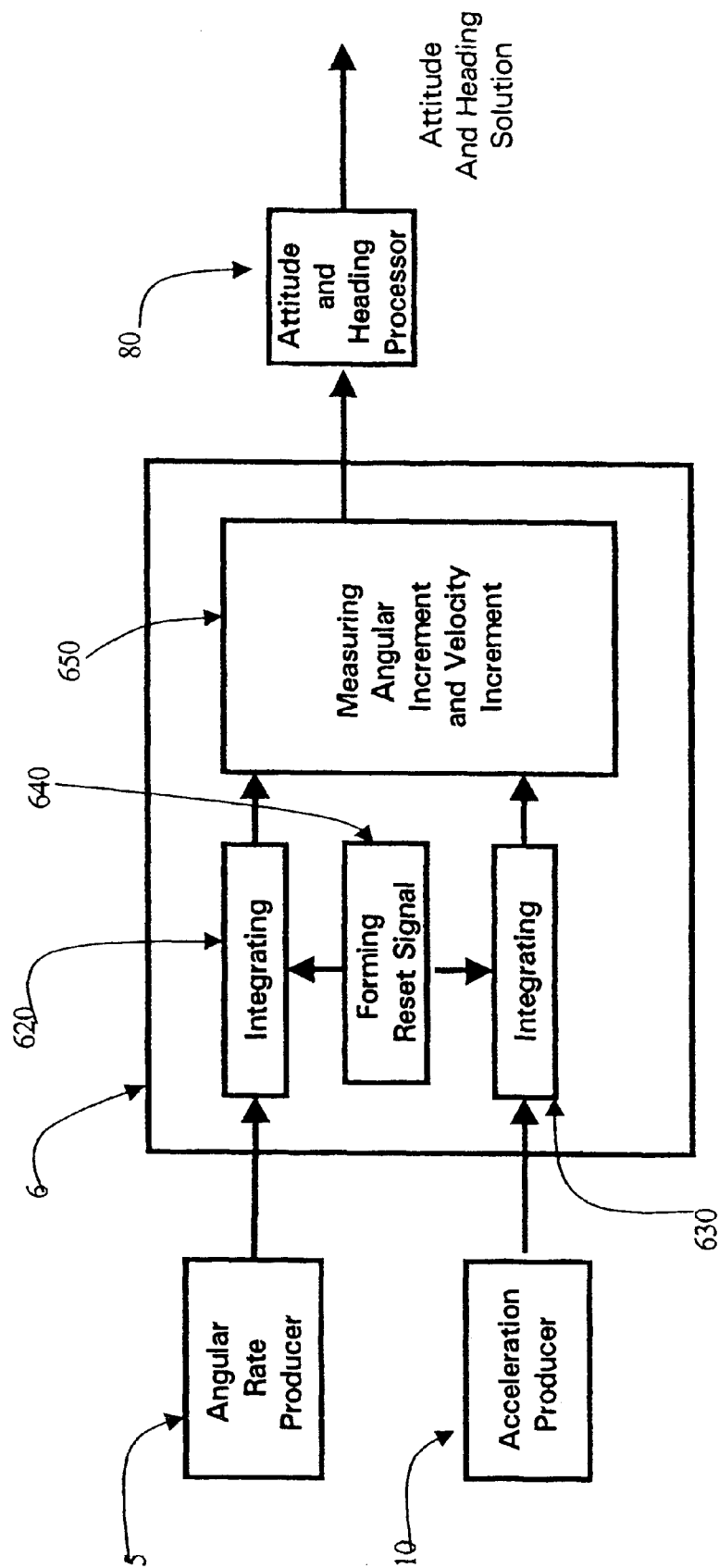
FIG. 4 is a block diagram illustrating an angular increment and velocity increment producer for output voltage signals of angular rate producer and acceleration producer for carrier motion measurements.

In some applications, the output signals of angular rate producer and acceleration producer, including MEMS angular rate device array and acceleration device array, are analog voltage signals. Therefore, referring to FIG. 4, the above mentioned step 2 further comprise:

2.1. integrating the three-axis angular rate analog voltage signals and three-axis acceleration analog voltage signals for a predetermined time interval to accumulate the three-axis angular analog voltage and three-axis velocity voltage as raw three-axis angular increment and three-axis velocity increment for the predetermined time interval to remove the noise signals that are non-directly proportional to the carrier angular rate and acceleration within the three-axis angular rate analog voltage signal and three-axis acceleration analog voltage signals and to improve signal-to-noise ratio and to remove the high frequent signals in three-axis angular rate analog voltage signals and three-axis acceleration analog voltage signals the so that the signals that are directly proportional to the carrier angular rate and acceleration within the three-axis angular rate analog voltage signals and three-axis acceleration analog voltage signals can be used in next processing steps, 2.2 forming a reset signal for the integrating processing to accumulate the three-axis angular voltage signal and three-axis velocity voltage signal from zero values at initial point of the next predetermined time interval, 2.3 measuring the raw three-angular increment and velocity increment voltage values.

In order to output real three-angular increment and velocity increment values as an optional output format in replace of raw three-angular increment and velocity increment voltage values, after step 2.3, an additional step comprising:

2.4 scaling the raw three-angular increment and velocity increment voltage values into real three-angular increment and velocity increment values.

Figure 5:
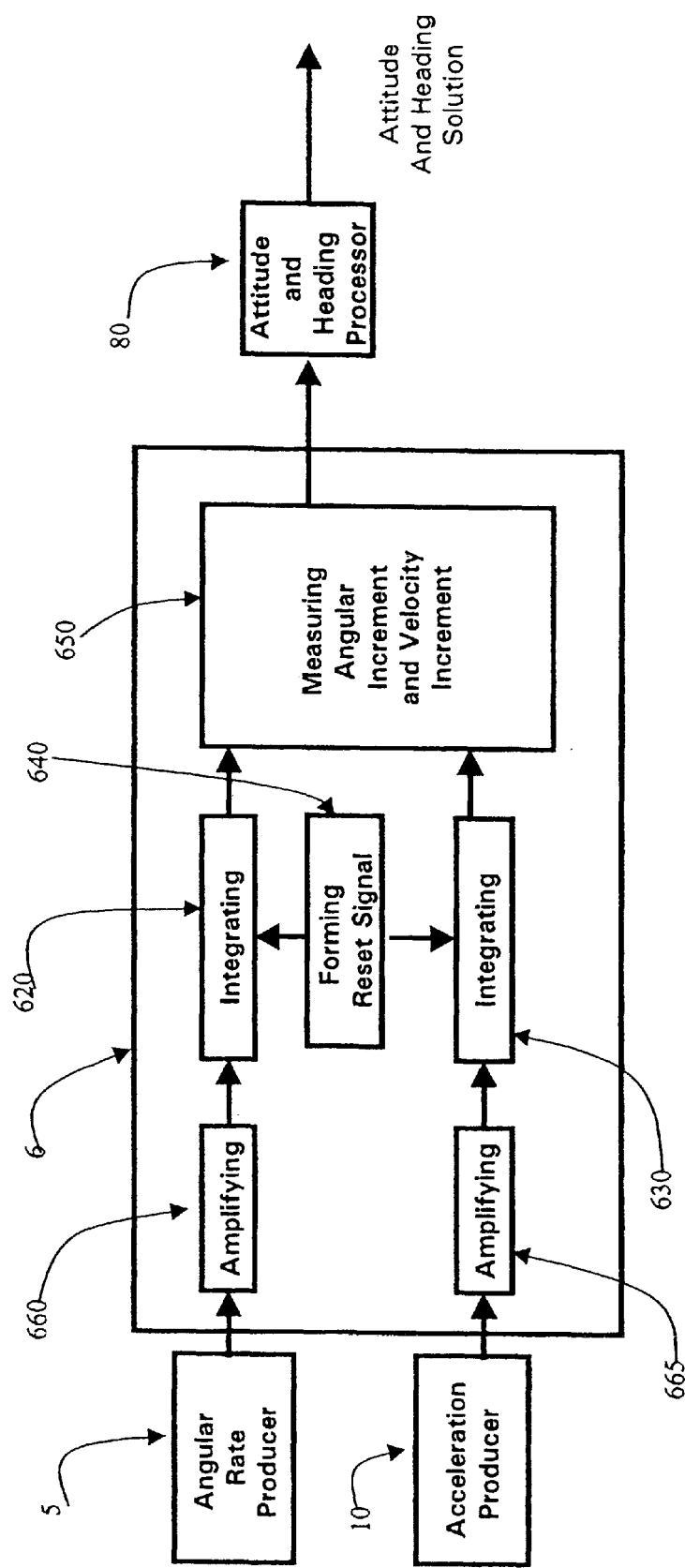
FIG. 5 is a block diagram illustrating another angular increment and velocity increment producer for output voltage signals of angular rate producer and acceleration producer for carrier motion measurements.

If the outputting analog voltage signals of angular rate producer and acceleration producer are too weak for the above mentioned integrating step not to read them, there is a amplifying step 2.0 between step 1 and step 2.1 for amplifying the analog voltage signals input from angular rate producer and acceleration producer and suppressing noises residing the analog voltage signals input from angular rate producer and acceleration producer, as shown in FIG. 5.

Figure 6:
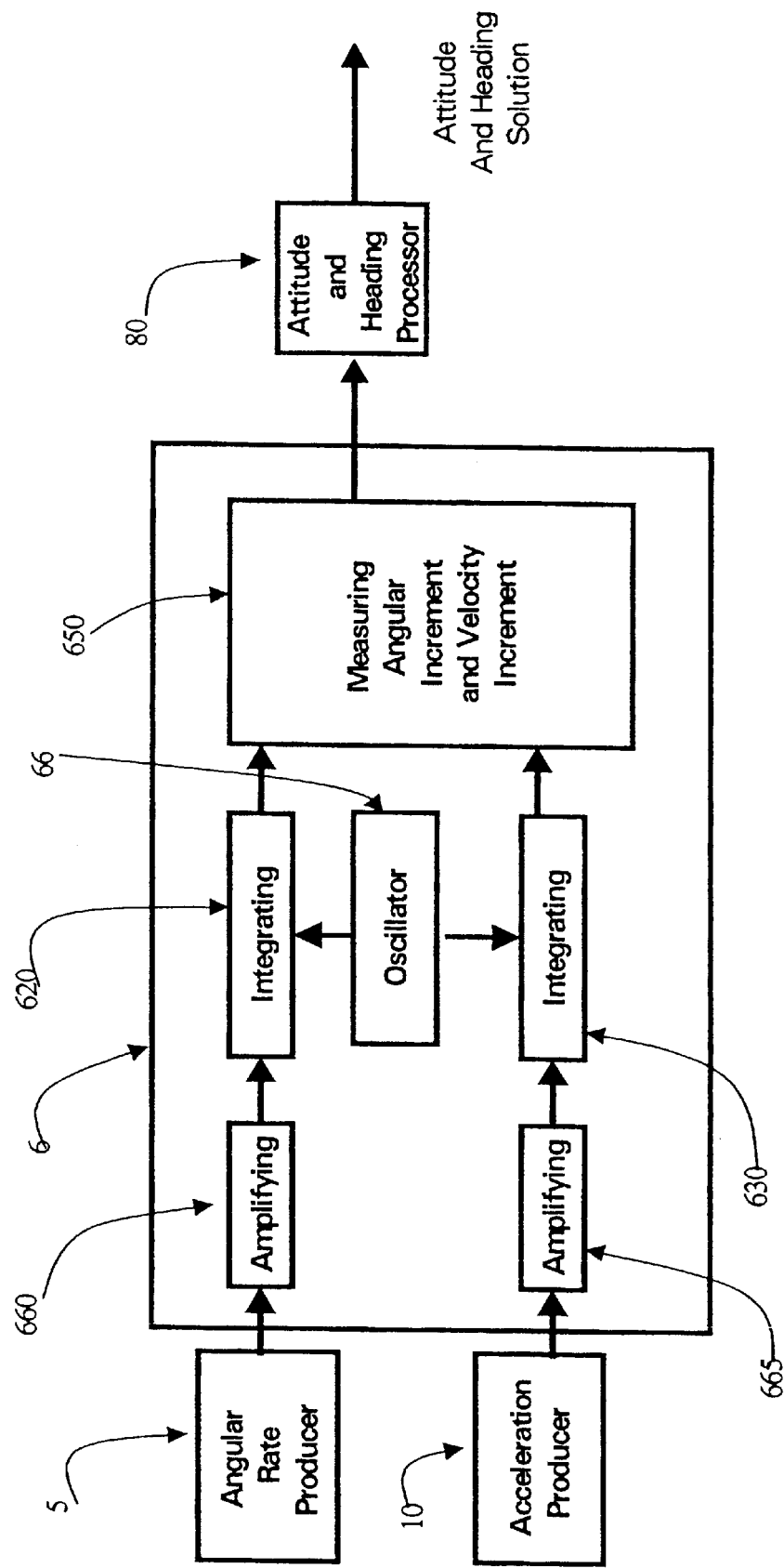
FIG. 6 is a block diagram illustrating another angular increment and velocity increment producer for output voltage signals of angular rate producer and acceleration producer for carrier motion measurements.

In general, step 2.2 may be implemented by an oscillator as shown in FIG. 6, and the step 2.2 further comprises:

2.2A. producing a timing pulse by an oscillator 66 and resetting the integrating processing at every initial point of the predetermined time interval.

Figure 7:
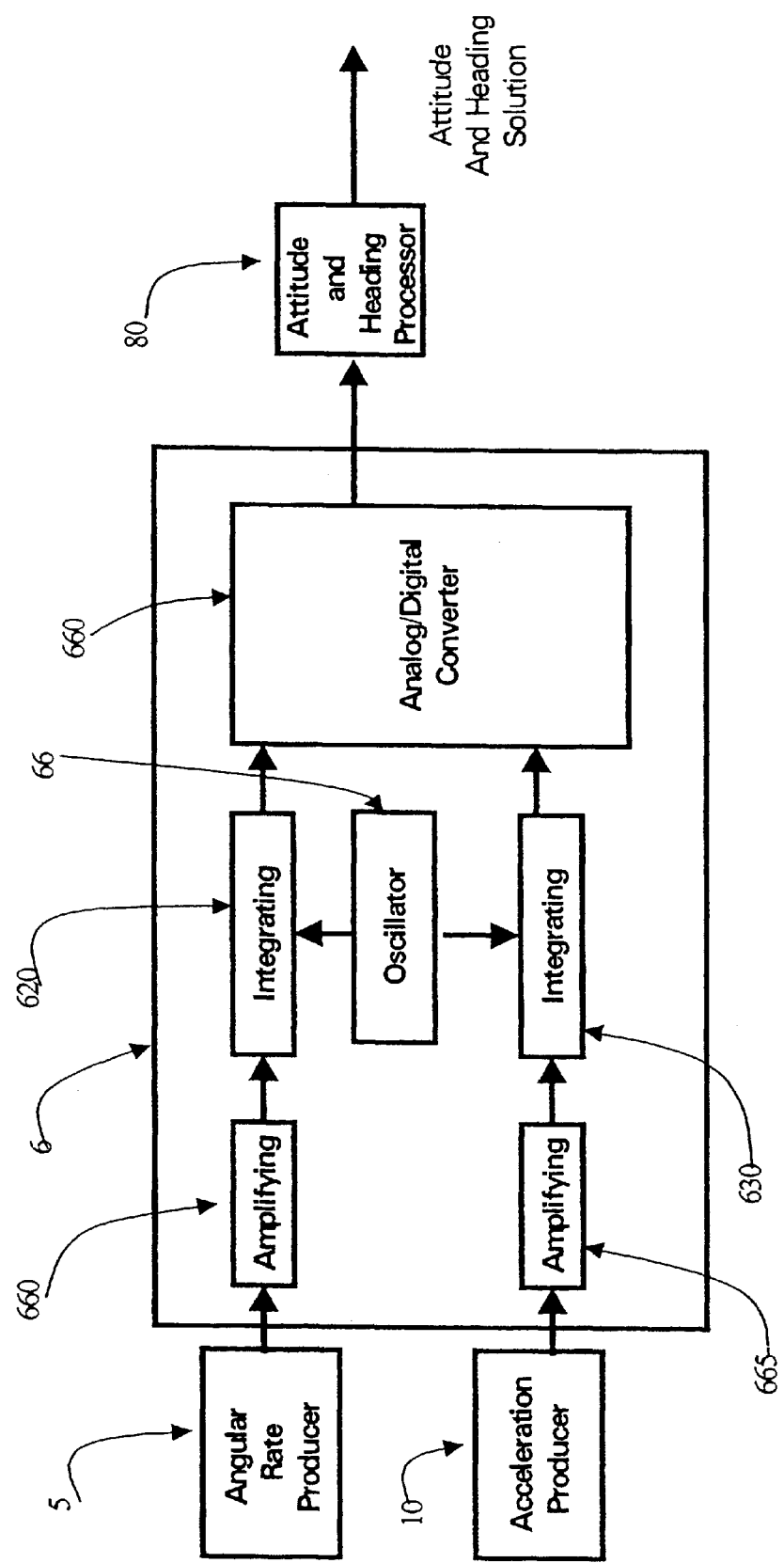
FIG. 7 is a block diagram illustrating another angular increment and velocity increment producer for output voltage signals of angular rate producer and acceleration producer for carrier motion measurements.

Step 2.3 can be may be implemented by an analog/digital converter 660, as shown in FIG. 7, and the step 2.3 further comprises:

2.3A digitizing the raw three-angular increment and velocity increment voltage values into digital three-angular increment and velocity increment values.

In applications, the above amplifying, integrating, analog/digital converter and oscillator can be built with circuits, including Application Specific Integrated Circuits (ASIC) a printed circuit board.

Figure 11:
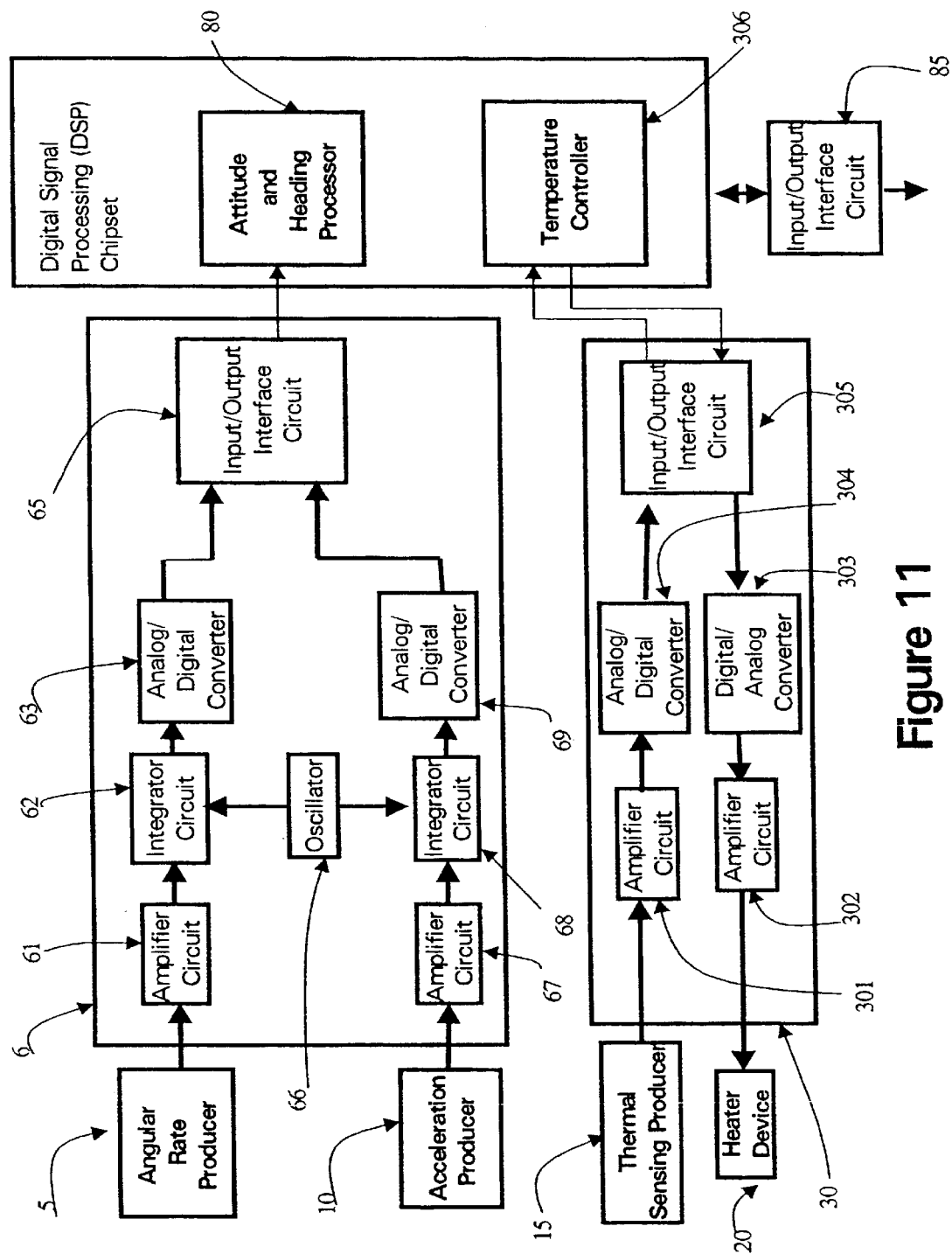
FIG. 11 is a block diagram illustrating a processing module for carrier motion measurements.

Referring to FIG. 11, step 2.0 further comprises:

2.0.1 acquiring three-axis analog voltage signals from the angular producer 5, which are directly proportional to the carrier angular rate; inputting the three-axis analog angular rate voltage signals to the amplifier circuit 61 for amplifying the input signals, respectively, and the amplified three-axis analog angular rate signals are output to the integrator circuit 62, 2.0.2 acquiring three-axis analog voltage signals from an acceleration producer 10, which are directly proportional to the carrier acceleration; inputting the three-axis analog acceleration voltage signals to the amplifier circuit 67 for amplifying the input signals, respectively; and the amplified three-axis analog acceleration signals are output to the integrator circuit 68, Step 2.1 further comprises:

2.1.1 integrating the input three-axis analog angular rate signals for the predetermined interval in the integrator circuit 62 to produce accumulated three-axis analog angular voltage signals, respectively, which represent angular increments for the predetermined interval, for improving the signal-to-noise ratio of the input signals, 2.1.2 integrating the input three-axis analog acceleration signals for the small interval in the integrator circuit 68 to produce accumulated voltage three-axis analog velocity signals, respectively, which represent velocity increments for the small interval for improving the signal-to-noise ratio of the input signals, Step 2.2 further comprises:

2.2.1 resetting the integrator circuit 62 according to the reset pulse from the oscillator 66; outputting the accumulated three-axis analog angular voltage signals to an analog/digital converter 63, 2.2.2 resetting the integrator circuit 68 according to the reset pulse from the oscillator 66; outputting the accumulated three-axis analog velocity increment voltage signals to analog/digital converter 69, Step 2.3 further comprises:

2.3.1 digitizing the accumulated voltage signals in the analog/digital converter 63; digitizing the sampled accumulated voltage signals in the analog/digital converter 63; outputting the digital three-axis angular increment voltage values to an input/output interface circuit 65, 2.3.1 digitizing the accumulated voltage signals in the analog/digital converter 69; digitizing the sampled accumulated voltage signals in the analog/digital converters 69; outputting the digital three-axis velocity increment voltage values to an input/output interface circuit 65, 2.3.3 outputting the digital three-axis angular increment voltage values and digital three-axis velocity increment voltage values by the input/output interface circuit 65.

Figure 8:
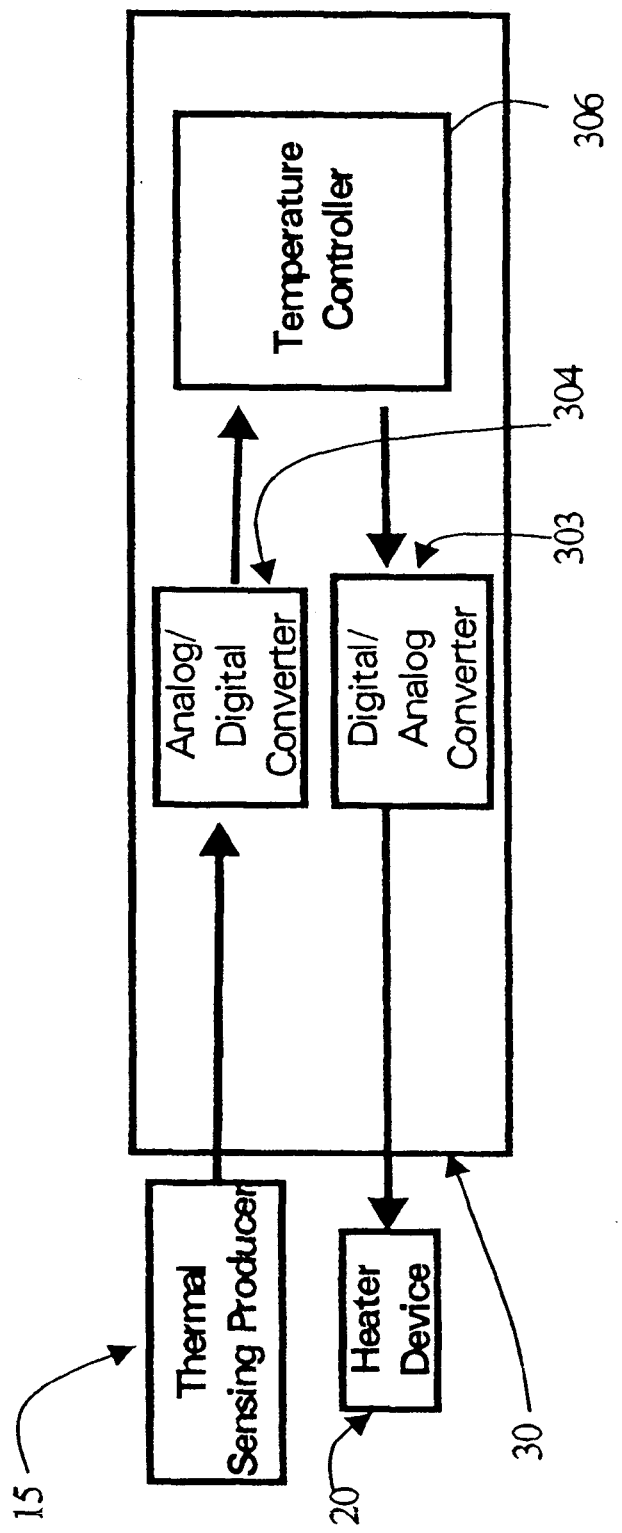
FIG. 8 is a block diagram illustrating a thermal processor for output analog voltage signals of the thermal sensing producer.

In order to achieve flexible adjustment of the thermal processor 30 for a thermal sensing producer 15 with analog voltage output and a heater device 20 with analog input, thermal processor 30 can be implemented in a digital feedback control loop as shown in FIG. 8. Referring to FIG. 8, the above step 4 further comprises:

4-1. producing voltage signals by thermal sensing producer 15 to analog/digital converter 304, 4-2 sampling the voltage signals in the analog/digital converter 304; and digitizing the sampled voltage signals; and the digital signals are output to the temperature controller 306, 4-3 computing digital temperature commands in the temperature controller 306 using the input digital temperature voltage signals from the analog/digital converter 304, temperature sensor scale factor, and predetermined operating temperature of the angular rate producer and acceleration producer; and digital temperature commands are fed back to a digital/analog converter 303, 4-4 converting the digital temperature commands input from the temperature controller 306 in a digital/analog converter 303 into analog signals; and the analog signals are output to the heater device 20.

Figure 9:
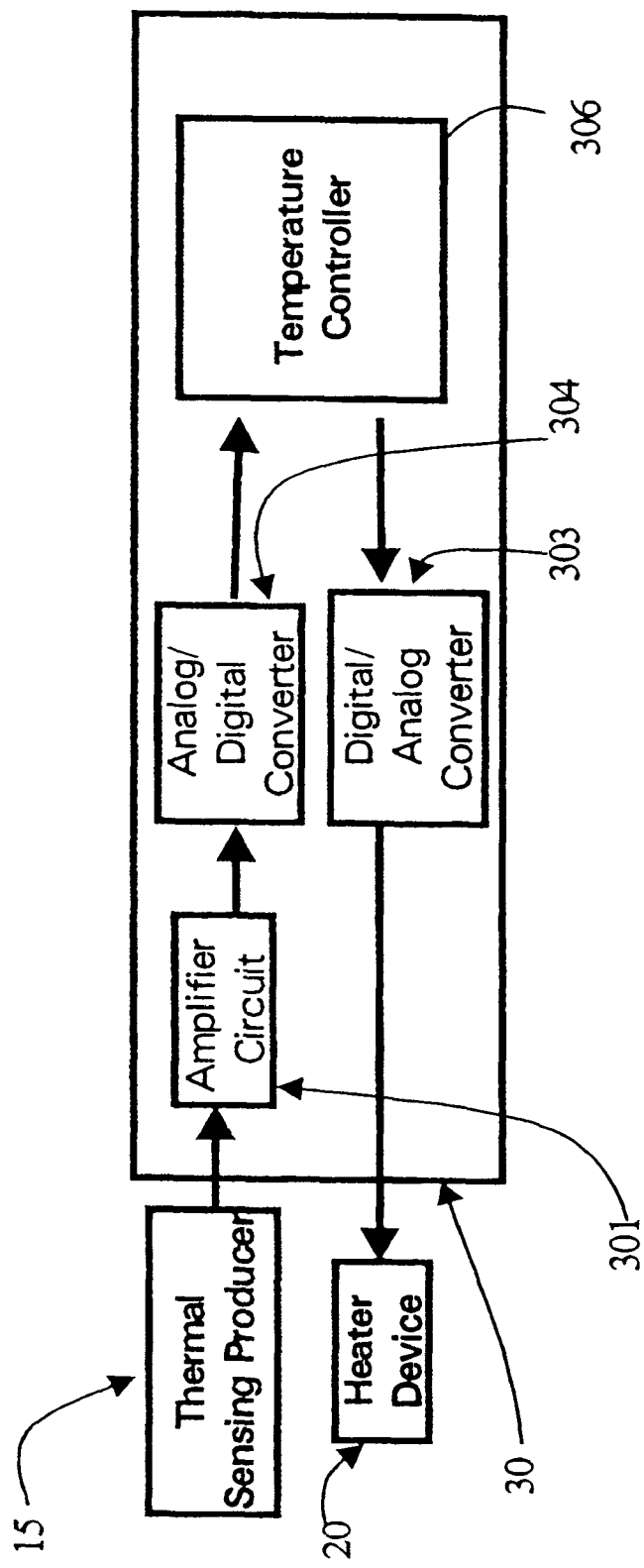
FIG. 9 is a block diagram illustrating another thermal processor for output analog voltage signals of the thermal sensing producer.

If the voltage signals by thermal sensing producer 15 are too weak for the analog/digital converter 304 not to read the signals, referring to FIG. 9 there is an additional amplifying step 4.0 between the thermal sensing producer and the digital/analog converter 303 comprising:

4-0. acquiring voltage signals from a thermal sensing producer 15 to the amplifier circuit 301 for amplifying the signals and suppressing the noise residing in the signals and improving the signal-to-noise ratio; and the amplified signals are output to analog/digital converter 304.

Figure 10:
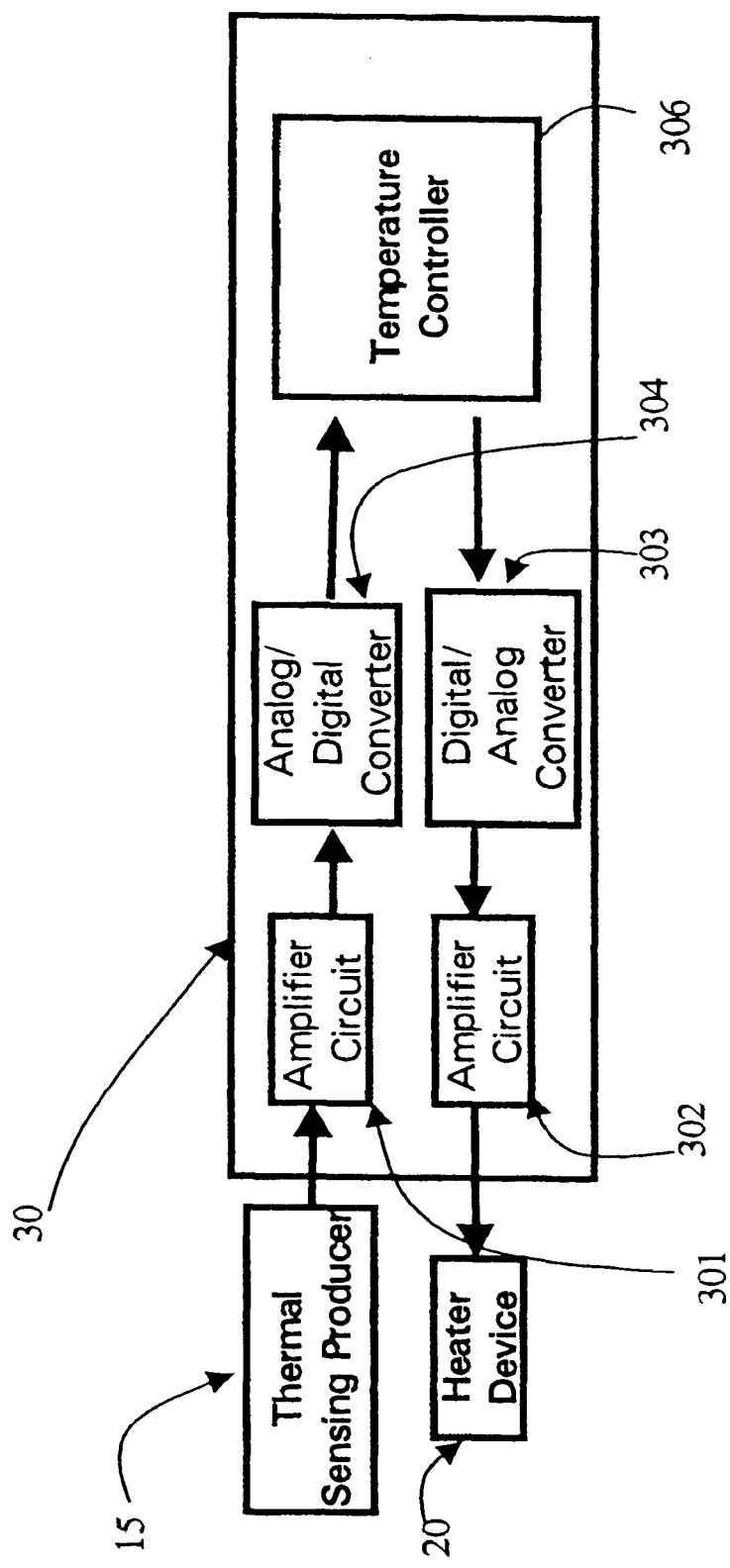
FIG. 10 is a block diagram illustrating another thermal processor for output analog voltage signals of the thermal sensing producer.

Generally, the heater device 20 requires a specific driving current signals. In this case, referring to FIG. 10, there is an amplifying step 4.5 between the digital/analog converter 303 and heater device 20:

4.5 amplifying the input analog signals from the digital/analog converter 303 for driving the heater device 20 in an amplifier 302; and closing the temperature control loop.

Sequentially, step 4.4 comprises:

4-4A. converting the digital temperature commands input from the temperature controller 306 in a digital/analog converter 303 into analog signals; and the analog signals are output to the amplifier 302.

Sometimes, an input/output interface circuit 305 is required to connect the analog/digital converter 304 and digital/analog converter 303 and with the the temperature controller 306. In this case, referring to FIG. 11, step 4.2 comprises 4.2A. sampling the voltage signals in the analog/digital converter 304; and digitizing the sampled voltage signals; and the digital signals are output to the an input/output interface circuit 305, Sequentially, step 4.3 comprises 4-3A. computing digital temperature commands in the temperature controller 306 using the input digital temperature voltage signals from input/output interface circuit 305, temperature sensor scale factor, and predetermined operating temperature of the angular rate producer and acceleration producer; and digital temperature commands are fed back to input/output interface circuit 305, and, step 4.4 comprises:

4-4B. converting the digital temperature commands input from input/output interface circuit 305 in a digital/analog converter 303 into analog signals; and the analog signals are output to the heater device 20.

Figure 12:
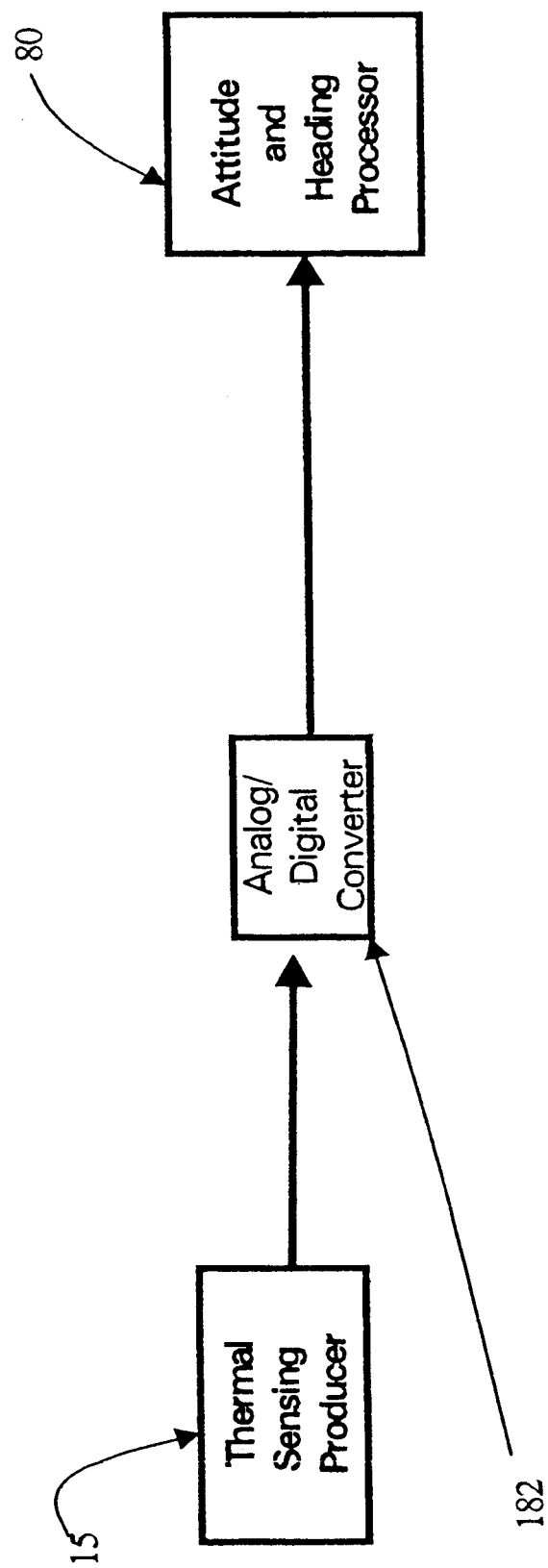
FIG. 12 is a block diagram illustrating a temperature digitizer for output analog voltage signals of the thermal sensing producer.
Figure 13:
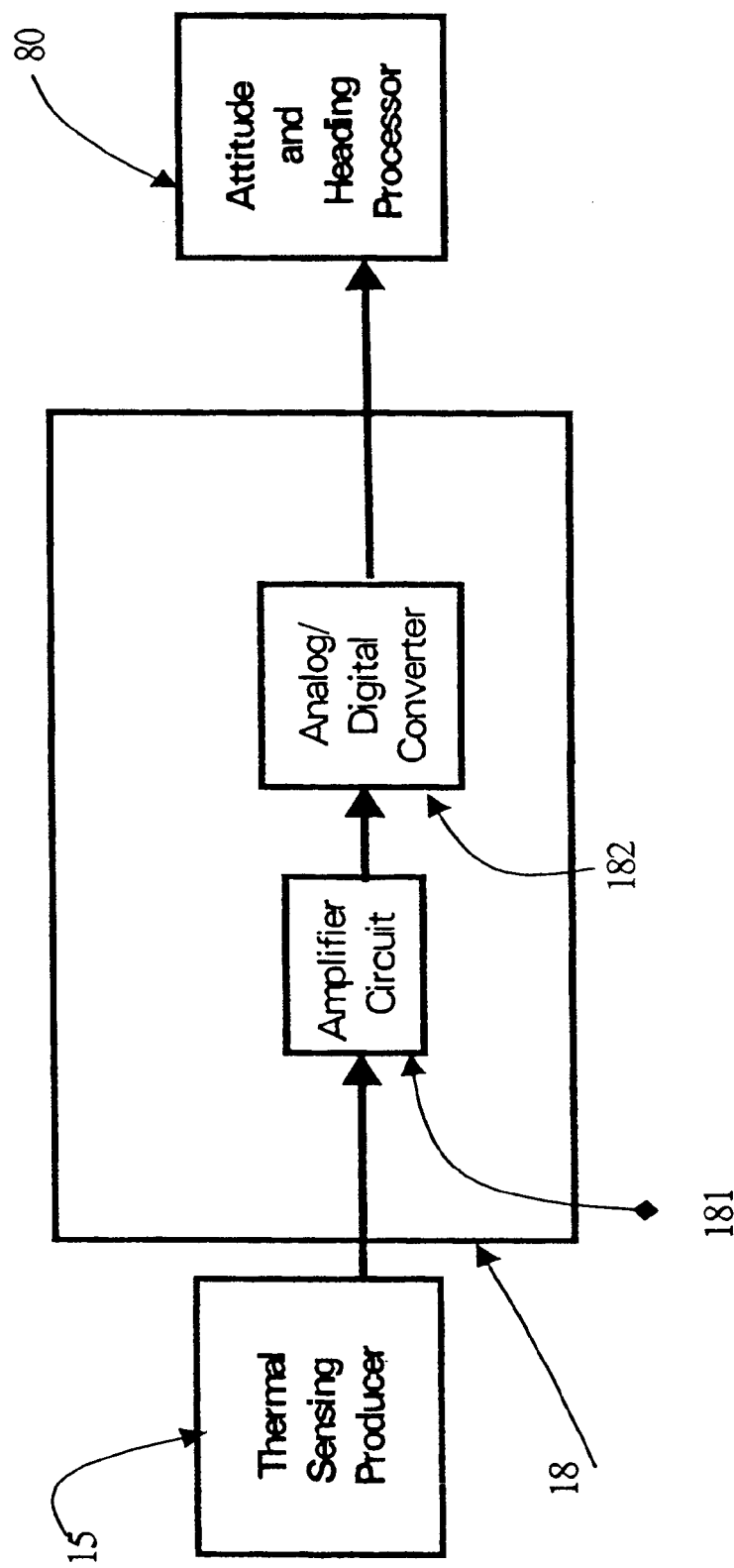
FIG. 13 is a block diagram illustrating a temperature digitizer for output analog voltage signals of the thermal sensing producer.

Referring to FIG. 12, the above mentioned step 3A.1 can be implemented by an analog/digital converter 182 for a thermal sensing producer 15 with analog voltage output. If the voltage signals by thermal sensing producer 15 are too weak for the digital/analog converter 182 not to read the signals, referring to FIG. 13 there is an additional amplifier between the thermal sensing producer 15 and the digital/analog converter 182. Step 3A.1 comprising:

3A.1.1 acquiring voltage signals from a thermal sensing producer 15 to the amplifier circuit 181 for amplifying the signals and suppressing the noise residing in the signals and improving the signal-to-noise ratio; and the amplified signals are output to analog/digital converter 182, 3A.1.2 sampling the input the amplified voltage signals in the analog/digital converters 182; and digitizing the sampled voltage signals; and the digital signals are output to the attitude and heading processor 80.

Sometimes, an input/output interface circuit 183 is required to connect the analog/digital converter 182 with the attitude and heading processor 80. In this case, referring to FIG. 14, step 3A.1.2 comprises 3A.1.2A. sampling the input the amplified voltage signals in the analog/digital converters 182; and digitizing the sampled voltage signals; and the digital signals are output to the input/output interface circuit 183.

Referring to FIG. 1, the digital three-axis angular increment voltage values or real values and three-axis digital velocity increment voltage values or real values are produced and outputted by step 2.

Figure 15:
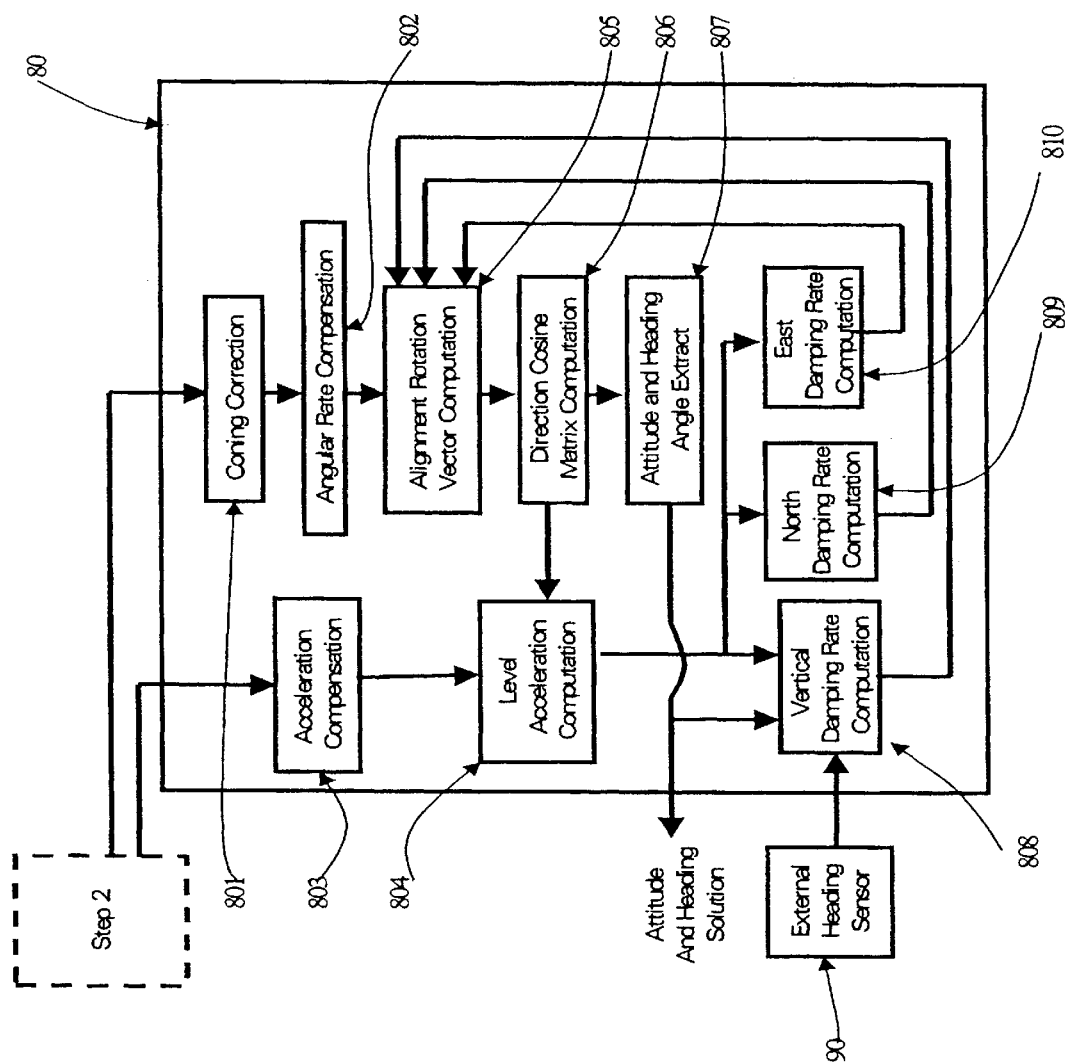
FIG. 15 is a block diagram illustrating the attitude and heading processing modules.

In the case of that the thermal control processing steps are used, in order to adapt to digital three-axis angular increment voltage value and three-axis digital velocity increment voltage values from step 2, referring to FIG. 15, the above mentioned step 3 further comprises:

3B.1 inputting digital three-axis angular increment voltage values from the input/output interface circuit 65 of Step 2 and coarse angular rate bias obtained from an angular rate producer and acceleration producer calibration procedure in high data rate (short interval) into a coning correction module 801; computing coning effect errors in the coning correction module 801 using the input digital three-axis angular increment voltage values and coarse angular rate bias; and outputting three-axis coning effect terms and three-axis angular increment voltage values at reduced data rate (long interval), which are called three-axis long-interval angular increment voltage values, into a angular rate compensation module 802, 3B.2 inputting the coning effect errors and three-axis long-interval angular increment voltage values from the coning correction module 801 and angular rate device misalignment parameters, fine angular rate bias, angular rate device scale factor, and coning correction scale factor from the angular rate producer and acceleration producer calibration procedure to the angular rate compensation module 802; compensating definite errors in the input three-axis long-interval angular increment voltage values using the input coning effect errors, angular rate device misalignment parameters, fine angular rate bias, and coning correction scale factor; transforming the compensated three-axis long-interval angular increment voltage values to real three-axis long-interval angular increments using the angular rate device scale factor; and outputting the real three-axis angular increments to an alignment rotation vector computation module 805, 3B.3 inputting the three-axis velocity increment voltage values from the input/output interface circuit 65 of Step 2 and acceleration device misalignment, acceleration device bias, and acceleration device scale factor from the angular rate producer and acceleration producer calibration procedure to accelerometer compensation module 803; transforming the input three-axis velocity increments voltage values into real three-axis velocity increments using the acceleration device scale factor; compensating the definite errors in three-axis velocity increments using the input acceleration device misalignment, accelerometer bias; outputting the compensated three-axis velocity increments to the level acceleration computation module 804, 3B.4 updating a quaternion, which is a vector representing rotation motion of the carrier, using the compensated three-axis angular increments from the angular rate compensation module 802, an east damping rate increment from an east damping computation module 808, a north damping rate increment from a north damping computation module 809, and vertical damping rate increment from a vertical damping computation module 810; and the updated quaternion is output to a direction cosine matrix computation module 806, 3B.5 computing the direction cosine matrix, using the input updated quaternion; and the computed direction cosine matrix is output to a level acceleration computation module 804 and an attitude and heading angle extract module 807, 3B.6 extracting attitude and heading angle using the direction cosine matrix from the direction cosine matrix computation module 806; outputting the heading angle into a vertical damping rate computation module 808, 3B.7 computing level velocity increments using the input compensated three-axis velocity increments from the acceleration compensation module 804 and the direction cosine matrix from the direction cosine matrix computation module 806; outputting the level velocity increments to an east damping rate computation module 810 and north damping rate computation module 809, 3B.8 computing east damping rate increments using the north velocity increment of the input level velocity increments from the level acceleration computation module 804; feeding back the east damping rate increments to the alignment rotation vector computation module 805, 3B.9 computing north damping rate increments using the east velocity increment of the input level velocity increments from the level acceleration computation module 804; feeding back the north damping rate increments to the alignment rotation vector computation module 805, 3B.10 computing vertical damping rate increments using the computed heading angle from the attitude and heading angle extract module 807 and a measured heading angle from an external sensor 90; and feeding back the vertical damping rate increments to the alignment rotation vector computation module 805.

Figure 14:
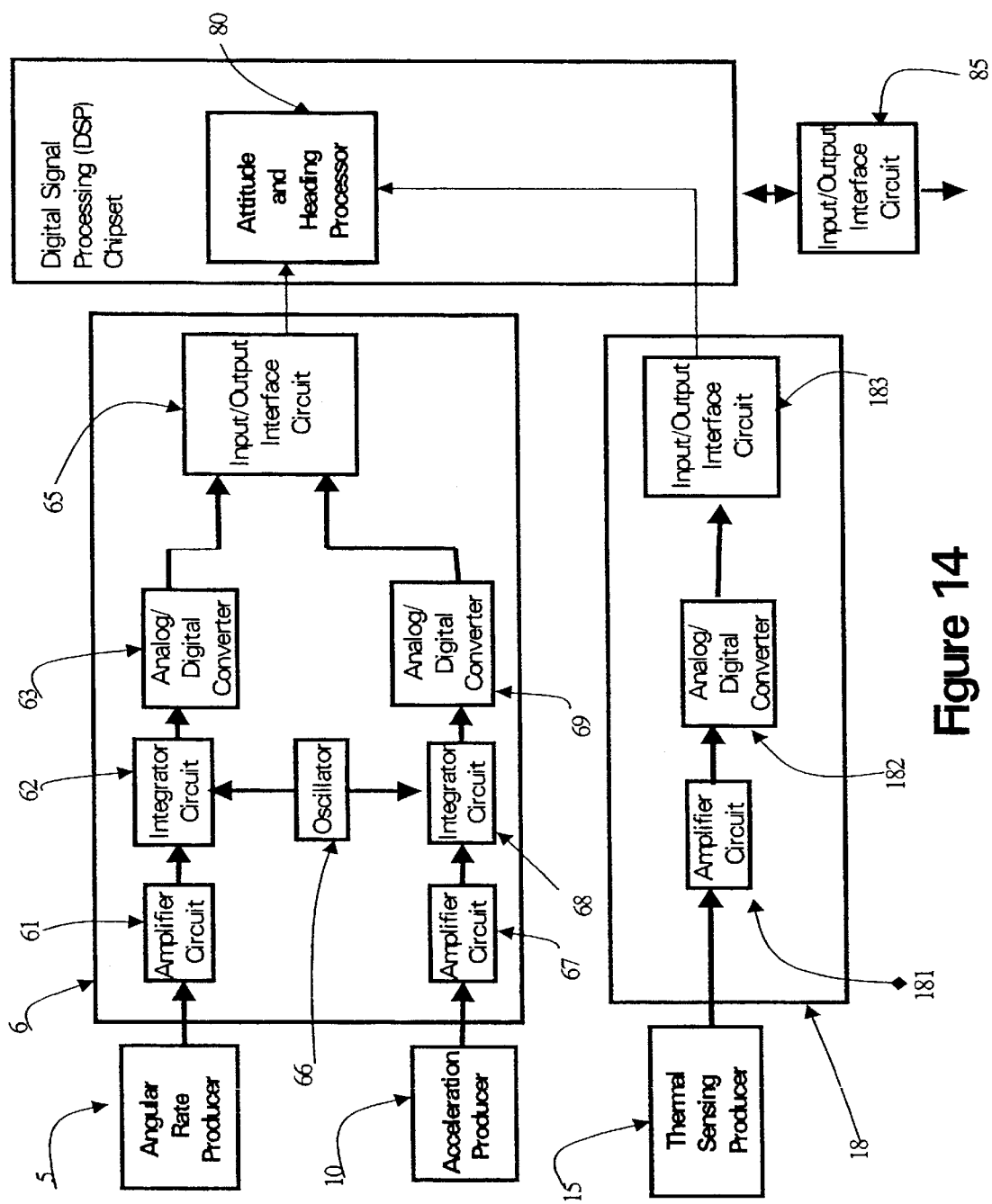
FIG. 14 is a block diagram illustrating a processing modules with thermal compensation processing for carrier motion measurements.

In order to adapt to real digital three-axis angular increment values and real three-axis digital velocity increment values from step 2, referring to FIG. 15, the above mentioned step 3B.1~3B.3 are modified into:

3B.1A inputting real digital three-axis angular increment values from Step 2 and coarse angular rate bias obtained from an angular rate producer and acceleration producer calibration procedure in high data rate (short interval) into a coning correction module 801; computing coning effect errors in the coning correction module 801 using the input digital three-axis angular increment values and coarse angular rate bias; and outputting three-axis coning effect terms and three-axis angular increment values at reduced data rate (long interval), which are called three-axis long-interval angular increment values, into a angular rate compensation module 802, 3B.2A inputting the coning effect errors and three-axis long-interval angular increment values from the coning correction module 801 and angular rate device misalignment parameters, fine angular rate bias, and coning correction scale factor from the angular rate producer and acceleration producer calibration procedure to the angular rate compensation module 802; compensating definite errors in the input three-axis long-interval angular increment values using the input coning effect errors, angular rate device misalignment parameters, fine angular rate bias, and coning correction scale factor; and outputting the real three-axis angular increments to an alignment rotation vector computation module 805, 3B.3A inputting the three-axis velocity increment values from Step 2 and acceleration device misalignment, and acceleration device bias from the angular rate producer and acceleration producer calibration procedure to accelerometer compensation module 803; compensating the definite errors in three-axis velocity increments using the input acceleration device misalignment, accelerometer bias; outputting the compensated three-axis velocity increments to the level acceleration computation module 804, In the case of that the thermal compensation processing steps are used, referring to FIGS. 14 and 15, in order to adapt to digital three-axis angular increment voltage value and three-axis digital velocity increment voltage values from step 2, the above mentioned step 3A.2 further comprises:

3A.2.1. inputting digital three-axis angular increment voltage values from the input/output interface circuit 65 of Step 2 and coarse angular rate bias obtained from an angular rate producer and acceleration producer calibration procedure in high data rate (short interval) into a coning correction module 801; computing coning effect errors in the coning correction module 801 using the input digital three-axis angular increment voltage values and coarse angular rate bias; and outputting three-axis coning effect terms and three-axis angular increment voltage values in reduced data rate (long interval), which are called three-axis long-interval angular increment voltage values, into a angular rate compensation module 802, 3A.2.2. inputting the coning effect errors and three-axis long-interval angular increment voltage values from the coning correction module 801 and angular rate device misalignment parameters, fine angular rate bias, angular rate device scale factor, and coning correction scale factor from the angular rate producer and acceleration producer calibration procedure to the angular rate compensation module 802; inputting the digital temperature signals from input/output interface circuit 183 of step 3A.1.2 and temperature sensor scale factor; computing current temperature of angular rate producer; accessing angular rate producer temperature characteristic parameters using the current temperature of angular rate producer; compensating definite errors in the input three-axis long-interval angular increment voltage values using the input coning effect errors, angular rate device misalignment parameters, fine angular rate bias, and coning correction scale factor; transforming the compensated three-axis long-interval angular increment voltage values to real three-axis long-interval angular increments; compensating temperature-induced errors in the real three-axis long-interval angular increments using the angular rate producer temperature characteristic parameters; and outputting the real three-axis angular increments to an alignment rotation vector computation module 805, 3A.2.3. inputting the three-axis velocity increment voltage values from the input/output interface circuit 65 of Step 2 and acceleration device misalignment, acceleration bias, acceleration device scale factor from the angular rate producer and acceleration producer calibration procedure to acceleration compensation module 803; inputting the digital temperature signals from input/output interface circuit 183 of step 3A.1 and temperature sensor scale factor; computing current temperature of acceleration producer; accessing acceleration producer temperature characteristic parameters using the current temperature of acceleration producer; transforming the input three-axis velocity increments voltage values into real three-axis velocity increments using the acceleration device scale factor; compensating the definite errors in three-axis velocity increments using the input acceleration device misalignment, acceleration bias; compensating temperature-induced errors in the real three-axis velocity increments using the acceleration producer temperature characteristic parameters; and outputting the compensated three-axis velocity increments to the level acceleration computation module 804, 3A.2.4. updating a quaternion, which is a vector representing rotation motion of the carrier, using the compensated three-axis angular increments from the angular rate compensation module 802, an east damping rate increment from an east damping computation module 808, a north damping rate increment from a north damping computation module 809, and vertical damping rate increment from a vertical damping computation module 810; and the updated quaternion is output to a direction cosine matrix computation module 806, 3A.2.5. computing the direction cosine matrix, using the input updated quaternion; and the computed direction cosine matrix is output to a level acceleration computation module 804 and an attitude and heading angle extract module 807, 3A.2.6. extracting attitude and heading angle using the direction cosine matrix from the direction cosine matrix computation module 806; outputting the heading angle into a vertical damping rate computation module 808, 3A.2.7. computing level velocity increments using the input compensated three-axis velocity increments from the acceleration compensation module 804 and the direction cosine matrix from the direction cosine matrix computation module 806; outputting the level velocity increments to an east damping rate computation module 810 and north damping rate computation module 809, 3A.2.8. computing east damping rate increments using the north velocity increment of the input level velocity increments from the level acceleration computation module 804; feeding back the east damping rate increments to the alignment rotation vector computation module 805, 3A.2.9. computing north damping rate increments using the east velocity increment of the input level velocity increments from the level acceleration computation module 804; feeding back the north damping rate increments to the alignment rotation vector computation module 805, 3A.2.10. computing vertical damping rate increments using the computed heading angle from the attitude and heading angel extract module 807 and a measured heading angle from an external sensor 90; and feeding back the vertical damping rate increments to the alignment rotation vector computation module 805.

Referring to FIGS. 14 and 15, in order to adapt to real digital three-axis angular increment values and real three-axis digital velocity increment values from step 2, the above mentioned step 3A.2.1~3A.2.3 are modified into:

3A.2.1A. inputting digital three-axis angular increment values from the input/output interface circuit 65 of Step 2 and coarse angular rate bias obtained from an angular rate producer and acceleration producer calibration procedure in high data rate (short interval) into a coning correction module 801; computing coning effect errors in the coning correction module 801 using the input digital three-axis angular increment values and coarse angular rate bias; and outputting three-axis coning effect terms and three-axis angular increment values in reduced data rate (long interval), which are called three-axis long-interval angular increment values, into a angular rate compensation module 802, 3A.2.2A. inputting the coning effect errors and three-axis long-interval angular increment values from the coning correction module 801 and angular rate device misalignment parameters, fine angular rate bias, and coning correction scale factor from the angular rate producer and acceleration producer calibration procedure to the angular rate compensation module 802; inputting the digital temperature signals from input/output interface circuit 183 of step 3A.1.2 and temperature sensor scale factor; computing current temperature of angular rate producer; accessing angular rate producer temperature characteristic parameters using the current temperature of angular rate producer; compensating definite errors in the input three-axis long-interval angular increment values using the input coning effect errors, angular rate device misalignment parameters, fine angular rate bias, and coning correction scale factor; compensating temperature-induced errors in the real three-axis long-interval angular increments using the angular rate producer temperature characteristic parameters; and outputting the real three-axis angular increments to an alignment rotation vector computation module 805, 3A.2.3A. inputting the three-axis velocity increment values from the input/output interface circuit 65 of Step 2 and acceleration device misalignment and acceleration bias from the angular rate producer and acceleration producer calibration procedure to acceleration compensation module 803; inputting the digital temperature signals from input/output interface circuit 183 of step 3A.1 and temperature sensor scale factor; computing current temperature of acceleration producer; accessing acceleration producer temperature characteristic parameters using the current temperature of acceleration producer; compensating the definite errors in three-axis velocity increments using the input acceleration device misalignment, acceleration bias; compensating temperature-induced errors in the real three-axis velocity increments using the acceleration producer temperature characteristic parameters; and outputting the compensated three-axis velocity increments to the level acceleration computation module 804.

What is claimed is:

1. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said three-axis acceleration signals into digital velocity increments in an angular increment and velocity increment producer; and (c) computing attitude and heading angle measurements using said three-axis digital angular increments and said three-axis velocity increments in an attitude and heading processor.

2. A processing method for motion measurement, comprising the steps of:

(a) producing three-axis angular rate signals by an angular rate producer and three-axis acceleration signals by an acceleration producer;

(b) converting said three-axis angular rate signals into digital angular increments and converting said three-axis acceleration signals into digital velocity increments in an angular increment and velocity increment producer;

(c) computing attitude and heading angle measurements using said three-axis digital angular increments and said three-axis velocity increments in an attitude and heading processor; and (d) maintaining a predetermined operating temperature throughout the above steps.

\* \* \* \* \*